US008066928B2

(12) United States Patent
Hogge et al.

(10) Patent No.: US 8,066,928 B2
(45) Date of Patent: Nov. 29, 2011

(54) METHOD OF PROVIDING A MOISTURE VAPOR BARRIER LAYER TO A CORE OF A GOLF BALL

(75) Inventors: Matthew F. Hogge, Plymouth, MA (US); Christopher Cavallaro, Lakeville, MA (US); Richard Foukes, Mars, PA (US); Michael J. Sullivan, Barrington, RI (US); William E. Morgan, Barrington, RI (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 82 days.

(21) Appl. No.: 12/365,254

(22) Filed: Feb. 4, 2009

(65) Prior Publication Data

US 2009/0169741 A1 Jul. 2, 2009

Related U.S. Application Data

(60) Continuation-in-part of application No. 11/766,838, filed on Jun. 22, 2007, now abandoned, and a continuation-in-part of application No. 11/368,752, filed on Mar. 6, 2006, now Pat. No. 7,547,746, which is a continuation-in-part of application No. 11/149,023, filed on Jun. 9, 2005, now abandoned, which is a continuation-in-part of application No. 10/755,638, filed on Jan. 12, 2004, now Pat. No. 7,357,733, and a continuation-in-part of application No. 10/759,494, filed on Jan. 16, 2004, now abandoned, and a continuation-in-part of application No. 10/194,291, filed on Jul. 15, 2002, now Pat. No. 6,905,423, which is a division of application No. 09/767,723, filed on Jan. 24, 2001, now abandoned, application No. 12/365,254, which is a continuation-in-part of application No. 11/505,390, filed on Aug. 17, 2006, now Pat. No. 7,601,079, which is a continuation of application No. 10/167,744, filed on Jun. 13, 2002, now Pat. No. 7,427,243.

(51) Int. Cl.
*B29C 41/14* (2006.01)

(52) U.S. Cl. ..................... 264/279; 264/279.1; 425/272; 427/430.1

(58) Field of Classification Search ........................ None
See application file for complete search history.

(56) References Cited

U.S. PATENT DOCUMENTS 1,589,711 A * 6/1926 Martinez ........................ 427/240
2,079,614 A * 5/1937 Holt et al. ........................ 118/58
2,091,455 A * 8/1937 Riddell ........................ 473/604
2,356,128 A 8/1944 Thomas et al.
3,099,644 A 7/1963 Parker et al.

(Continued)

FOREIGN PATENT DOCUMENTS

GB 2291812 2/1996

(Continued)

*Primary Examiner* — Edmund H. Lee
(74) *Attorney, Agent, or Firm* — Margaret C. Barker

(57) ABSTRACT

A method of forming a water vapor barrier layer to a core of a golf ball is provided. The method includes placing the core of the golf ball into a vapor barrier composition, withdrawing the lifting device, and spinning and optionally oscillating the core within the composition for a time sufficient for the composition to form a layer on the core. The present invention also provides an apparatus that can be used to form a water vapor barrier layer.

10 Claims, 4 Drawing Sheets

U.S. PATENT DOCUMENTS

| | | | |
|---|---|---|---|
| 3,147,324 | A | 9/1964 | Ward |
| 3,239,228 | A | 3/1966 | Crompton |
| 3,241,834 | A | 3/1966 | Stingley |
| 3,313,545 | A | 4/1967 | Bartsch |
| 3,642,728 | A | 2/1972 | Canter |
| 4,123,061 | A | 10/1978 | Dusbiber |
| 4,229,337 | A | 10/1980 | Brenner |
| 4,239,799 | A | 12/1980 | Weinberg et al. |
| 4,431,193 | A | 2/1984 | Nesbitt |
| 4,501,842 | A | 2/1985 | Chmiel et al. |
| 4,692,497 | A | 9/1987 | Gendreau et al. |
| 4,871,589 | A | 10/1989 | Kitaoh et al. |
| 4,884,814 | A | 12/1989 | Sullivan |
| 4,919,434 | A | 4/1990 | Saito |
| 5,006,297 | A | 4/1991 | Brown et al. |
| 5,118,748 | A | 6/1992 | Fujita et al. |
| 5,120,791 | A | 6/1992 | Sullivan |
| 5,252,652 | A | 10/1993 | Egashira et al. |
| 5,253,871 | A | 10/1993 | Viollaz |
| 5,314,187 | A | 5/1994 | Proudfit |
| 5,324,783 | A | 6/1994 | Sullivan |
| 5,334,673 | A | 8/1994 | Wu |
| 5,403,453 | A | 4/1995 | Roth et al. |
| 5,456,972 | A | 10/1995 | Roth et al. |
| 5,461,109 | A | 10/1995 | Blair et al. |
| 5,484,870 | A | 1/1996 | Wu |
| 5,492,972 | A | 2/1996 | Stefani |
| 5,658,670 | A | 8/1997 | Fukushi et al. |
| 5,669,831 | A | 9/1997 | Lutz |
| 5,683,312 | A | 11/1997 | Boehm et al. |
| 5,688,191 | A | 11/1997 | Cavallaro et al. |
| 5,697,856 | A | 12/1997 | Moriyama et al. |
| 5,703,166 | A | 12/1997 | Rajagopalan et al. |
| 5,704,853 | A | 1/1998 | Maruko et al. |
| 5,733,428 | A | 3/1998 | Calabria et al. |
| 5,803,831 | A | 9/1998 | Sullivan |
| 5,820,488 | A | 10/1998 | Sullivan et al. |
| 5,824,746 | A | 10/1998 | Harris et al. |
| 5,827,133 | A | 10/1998 | Chang |
| 5,885,172 | A | 3/1999 | Hebert et al. |
| 5,981,658 | A | 11/1999 | Rajagopalan et al. |
| 6,016,685 | A | 1/2000 | Ekstrom et al. |
| 6,062,283 | A | 5/2000 | Watanabe et al. |
| 6,117,024 | A | 9/2000 | Dewanjee |
| 6,117,025 | A | 9/2000 | Sullivan |
| 6,126,559 | A | 10/2000 | Sullivan et al. |
| 6,132,324 | A | 10/2000 | Hebert et al. |
| 6,149,535 | A | 11/2000 | Bissonnette et al. |
| 6,162,135 | A | 12/2000 | Bulpett et al. |
| 6,180,040 | B1 | 1/2001 | Ladd et al. |
| 6,180,722 | B1 | 1/2001 | Dalton et al. |
| 6,190,816 | B1 | 2/2001 | Takehara et al. |
| 6,210,293 | B1 | 4/2001 | Sullivan |
| 6,217,464 | B1 | 4/2001 | Chang |
| 6,228,940 | B1 | 5/2001 | Sullivan et al. |
| 6,241,626 | B1 | 6/2001 | Sullivan et al. |
| 6,284,840 | B1 | 9/2001 | Rajagopalan et al. |
| 6,291,592 | B1 | 9/2001 | Bulpett et al. |
| 6,315,915 | B1 | 11/2001 | Hebert et al. |
| 6,322,650 | B1 | 11/2001 | Gilmore et al. |
| 6,334,919 | B1 | 1/2002 | Takeyama et al. |
| 6,339,119 | B1 | 1/2002 | Ladd et al. |
| 6,342,567 | B2 | 1/2002 | Minagawa et al. |
| 6,346,571 | B1 | 2/2002 | Dharmarajan et al. |
| 6,394,914 | B1 | 5/2002 | Sullivan |
| 6,414,082 | B1 | 7/2002 | Rajagopalan et al. |
| 6,465,578 | B1 | 10/2002 | Bissonnette et al. |
| 6,547,677 | B2 | 4/2003 | Sullivan et al. |
| 6,632,147 | B2 | 10/2003 | Cavallaro et al. |
| 6,635,716 | B2 | 10/2003 | Voorheis et al. |
| 6,736,838 | B1 | 5/2004 | Richter |
| 6,800,690 | B2 | 10/2004 | Rajagopalan et al. |
| 6,806,347 | B2 | 10/2004 | Hogge et al. |
| 6,812,317 | B2 | 11/2004 | Dalton et al. |
| 6,838,028 | B2 | 1/2005 | Hogge et al. |
| 6,932,720 | B2 | 8/2005 | Hogge et al. |
| 7,004,854 | B2 | 2/2006 | Hogge et al. |
| 7,004,855 | B2 | 2/2006 | Jordan |
| 7,014,575 | B2 | 3/2006 | Sullivan et al. |
| 2001/0005699 | A1 | 6/2001 | Morgan et al. |
| 2002/0151380 | A1 | 10/2002 | Sullivan |
| 2003/0022733 | A1 | 1/2003 | Sullivan et al. |
| 2003/0171163 | A1 | 9/2003 | Hogge et al. |
| 2003/0232666 | A1 | 12/2003 | Sullivan |
| 2004/0048688 | A1 | 3/2004 | Hogge et al. |
| 2004/0142769 | A1 | 7/2004 | Hogge et al. |
| 2004/0147344 | A1 | 7/2004 | Sullivan |
| 2004/0185963 | A1 | 9/2004 | Hogge et al. |

FOREIGN PATENT DOCUMENTS

| | | |
|---|---|---|
| WO | WO/23519 | 4/2000 |
| WO | WO/129129 | 4/2001 |

* cited by examiner

METHOD OF PROVIDING A MOISTURE VAPOR BARRIER LAYER TO A CORE OF A GOLF BALL

FIELD OF THE INVENTION

The present invention relates to golf balls, and more particularly to a novel method of coating the core with a moisture vapor barrier layer.

CROSS-REFERENCE

This application is a continuation-in-part of U.S. patent application Ser. No. 11,766,838, filed Jun. 22, 2008 (U.S. Publ. No. 20080315469A1) now abandoned. Additionally, this application is a continuation-in-part of U.S. patent application Ser. No. 11, 368,752, filed Mar. 6, 2006 now U.S. Pat. No. 7,547,746, which is a continuation-in-part of U.S. patent application Ser. No. 11,149,023, filed Jun. 9, 2005 (abandoned), which is a continuation-in-part of each of U.S. patent applications Ser. Nos. 10,755,638, filed Jan. 12, 2004 (now U.S. Pat. No. 7,357,733), 10,759,494, filed Jan. 16, 2004 (abandoned) and 10,194,291, filed Jul. 15 2002 (now U.S. Pat. No. 6,905,423), a division of U.S. patent application Ser. No. 09/767,723, filed Jan. 24, 2001 (abandoned). The present application is also a continuation-in-part of U.S patent application Ser. No. 11,505,390, filed Aug. 17, 2006 now U.S. Pat. No. 7,601,079, which is a continuation of U.S. patent application Ser. No. 10,167,744, filed Jun. 13, 2002 (now U.S. Pat. No. 7,427,243). The disclosures of the parent cases are incorporated by reference herein in their entireties.

BACKGROUND OF THE INVENTION

Solid core golf balls are well known in the art. Typically, the core is made from polybutadiene rubber material, which provides the primary source of resiliency for the golf ball. U.S. Pat. Nos. 3,241,834 and 3,313,545, which are incorporated herein by reference in their entirety, disclose the early work in polybutadiene chemistry. It is also known in the art that increasing the cross-link density of polybutadiene can increase the resiliency of the core. The core is typically protected by a cover from repeated impacts from the golf clubs. The golf ball may comprise additional layers, which can be an outer core or an inner cover layer. One or more of these additional layers may be a wound layer of stretched elastic windings to increase the resiliency of the ball.

A known drawback of polybutadiene cores cross-linked with peroxide and/or zinc diacrylate is that moisture adversely affects this material. Water moisture vapor reduces the resiliency of the core and degrades its properties. A polybutadiene core will absorb water and loose its resilience. Thus, preferably a golf ball core is covered quickly to maintain optimum ball properties. The cover is typically made from ionomer resins, balata, and urethane, among other materials. The ionomer covers, particularly the harder ionomers, offer some protection against the penetration of water vapor. However, it is more difficult to control or impart spin to balls with hard covers. Conventional urethane covers, on the other hand, while providing better ball control, offer less resistance to water vapor than ionomer covers.

Prolonged exposure to high humidity and elevated temperature may be sufficient to allow water vapor to invade the cores of some commercially available golf balls. For example at 110° F. and 90% humidity for a sixty day period, significant amounts of moisture enter the cores and reduce the initial velocity of the balls by 1.8 ft/s to 4.0 ft/s or greater. The change in compression may vary from 5 to about 10 or greater. The absorbed water vapor also reduces the coefficient of restitution (COR) of the ball.

Several prior patents have addressed the water vapor absorption issue. Commonly owned U.S. Pat. No. 6,632,147 B2, which is incorporated herein by reference in its entirety, describes a barrier layer in the form of an intermediate layer that has a moisture vapor transmission rate lower than that of the cover. The moisture vapor barrier layer may comprise nanoparticles, flaked glass, leafing or non-leafing metal flakes (e.g., aluminum flakes, iron oxide flakes, copper flakes, bronze flakes) or ceramic particles to increase the layer's resistance to the transmission of moisture through the layer. The primary ingredient of the barrier layer is made from a material or composition, such as polybutadiene, natural rubber, butyl-based rubber, acrylics, trans-polyisoprene, neoprene, chlorinated polyethylene, and balata. Furthermore, in one example, the intermediate layer is made from a multilayer thermoplastic film having a base layer and a coating layer. The base layer includes polyethylene teraphthalate, polybutylene teraphthalate, polyethylene naphthalate, polycyclohexanedimethylene teraphthalate, and polyethylene naphthalate bibenzoate and the coating layer includes polyvinylidene chloride, ethylene vinyl alcohol, modified polyester, silicon oxide, and one or more copolyesters prepared from dicarboxylic acids and diols or its derivatives. The vapor barrier layer can also have high specific gravity to form a ball with high moment of inertia.

U.S. Pat. No. 5,820,488 discloses a golf ball with a solid inner core, an outer core, and a water vapor barrier layer disposed there between. The water vapor barrier layer can be a polyvinylidene chloride (PVDC) layer or a vermiculite layer. Commonly owned U.S. Pat. Nos. 5,885,172 and 6,132,324 disclose, among other things, a golf ball with a polybutadiene or wound core with an ionomer resin inner cover and a relatively soft urethane outer cover. The hard ionomer inner cover offers some resistance to water vapor penetration and the soft outer cover provides the desirable ball control. It is also desirable to minimize the water barrier layer such that other properties of the ball are unaffected. These references are incorporated herein by reference in their entireties.

Known methods for forming the moisture vapor barrier layers include using pre-formed semi-cured shells. A quantity of mixed stock of the preferred moisture vapor barrier material is placed into a compression mold and molded under sufficient pressure, temperature, and time to produce semi-cured, semi-rigid half-shells. The half-shells are then placed around a core (solid or wound) and the sub-assembly is cured in another compression molding machine to complete the curing process. A cover is then formed on the sub-assembly by any known method to complete the fabrication of the ball. Another known method is the sheet stock and vacuum method. Thin sheets of the mixed stock of the preferred moisture vapor barrier material are placed on the upper and lower platens of a compression-molded press. Suction force from a vacuum keeps the sheets tight against the mold cavities. A core (solid or wound) is placed in the bottom cavity above the vacuumed sheet. The sub-assembly is then cured in a compression molding press to cure the sub-assembly. A cover is then formed on the sub-assembly by any known method to complete the fabrication of the ball. Another known method is the rubber injection molding, wherein mixed stock of the preferred moisture vapor barrier material is fed into an injection molding barrel and screw. The stock is then injected through a nozzle into a mold cavity and surrounds a core (solid or wound). The sub-assembly is then heated under pressure to cure the sub-assembly. A cover is then formed on the sub-assembly by any known method to complete the fabrication of the ball. Other manufacturing techniques include spraying, dipping, vacuum deposition, reaction injection molding, among others. All of above-described methods which incorporate a water vapor barrier layer on the surface of the core have shortcomings, such as being expensive, not fully cover the pores of the core, and time consuming.

Thus, there remains a need for golf improved methods for applying the water vapor barrier layer on to the core of the golf ball.

SUMMARY OF THE INVENTION

The present invention is directed to a method of forming a water vapor barrier layer on a core or a sub-assembly of a golf ball. The method comprises the steps of placing the core or the sub-assembly into a composition that is capable of forming a barrier layer of the golf ball, spinning the core within the composition for a time sufficient for the composition to coat the core or sub-assembly, and removing the coated core from the composition. Heat may be added to cure the composition.

The present invention is also related to a coating apparatus that is capable of forming a coating on the core or sub-assembly of a golf ball, wherein the apparatus is designed such that minimal cleaning of the apparatus is necessary.

It is to be understood that both the foregoing general description and the following detailed description are exemplary and explanatory only and are intended to provide a further explanation of the present invention, as claimed.

BRIEF DESCRIPTION OF THE DRAWINGS

In the accompanying drawings, which form a part of the specification and are to be read in conjunction therewith, and in which like reference numerals are used to indicate like parts in the various views.

DETAILED DESCRIPTION OF THE INVENTION

The present invention relates to a method and apparatus of forming a layer of a golf ball. Preferably, the layer is a water vapor barrier layer. It is generally known that solid and wound golf balls are subjected to prolonged storage under ambient conditions and the coefficient of restitution ("COR") of said golf balls will tend to decrease over time. The weight also increases as the balls absorb water vapor. It is believed that the absorption of moisture within the balls causes the reduction in COR. Moisture is not only absorbed and retained by golf balls that are soaked in water, but also by golf balls that are stored under conditions in which moisture is in the air, including indoor and outdoor conditions of "average" humidity, i.e., 25-35% relative humidity (RH), as well as conditions of high humidity, i.e. 65-75% RH, or more.

To minimize the penetration of moisture, typically water vapor, into the core, a barrier layer is placed between the core or sub-assembly and the cover, preferably, immediately around the core. Thus, in general, a golf ball, at a minimum, includes a core; an intermediate layer or coating, which is preferably the water vapor barrier layer; and a cover layer. In the present invention, the method of placing the intermediate layer on the core of the golf ball includes placing the core into a vessel containing a barrier composition that can form at least one layer of the golf ball. Once the core is placed in the vessel, the core is spun for a time, at a temperature, and speed sufficient for the water vapor barrier composition to form a layer on the core surface. The coated core can then be removed from the vessel. As used herein, core includes the innermost core and any intermediate layer(s) to be coated by the barrier composition. The present invention also provides an apparatus that coats the surface of the core with a water vapor barrier composition. The apparatus of the present invention includes a lifting device for lifting the core, a vessel containing the barrier composition and a rotating device that spins the core while in the vessel.

Figure 1:
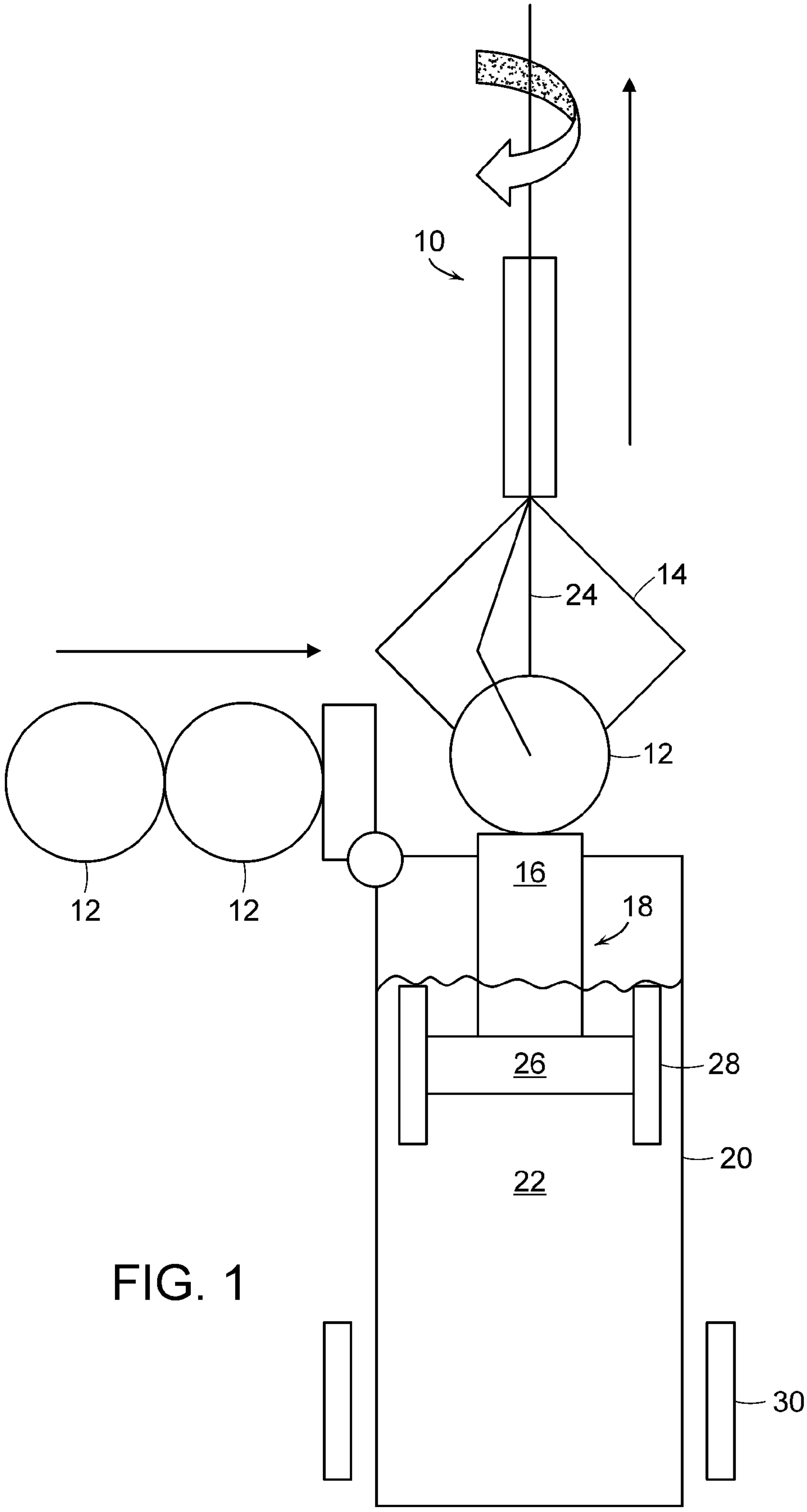
FIG. 1 is a schematic diagram of the apparatus of the present invention that illustrates placing the core of a golf ball on a platform.

As shown generally in FIG. 1, lifting device 10 is capable of acquiring one of cores 12 via prongs 14. To reduce the need for cleaning prongs 14, lifting device 10 places acquired core 12 on holder 16 of platform 18, and prongs 14 do not enter vessel 20. As illustrated in FIG. 1, preferably, platform 18 is partially immersed in vessel 20 containing barrier composition 22. More preferably, platform 18 is immersed in composition 22 in a way such that at least a portion of ball holder 16 is not in contact with composition 22 when core 12 is initially placed on holder 16. To prevent core 12 from rolling or falling from holder 16, an optional force applicator 24 can be applied to core 12 to hold core 12 in its position.

Figure 2:
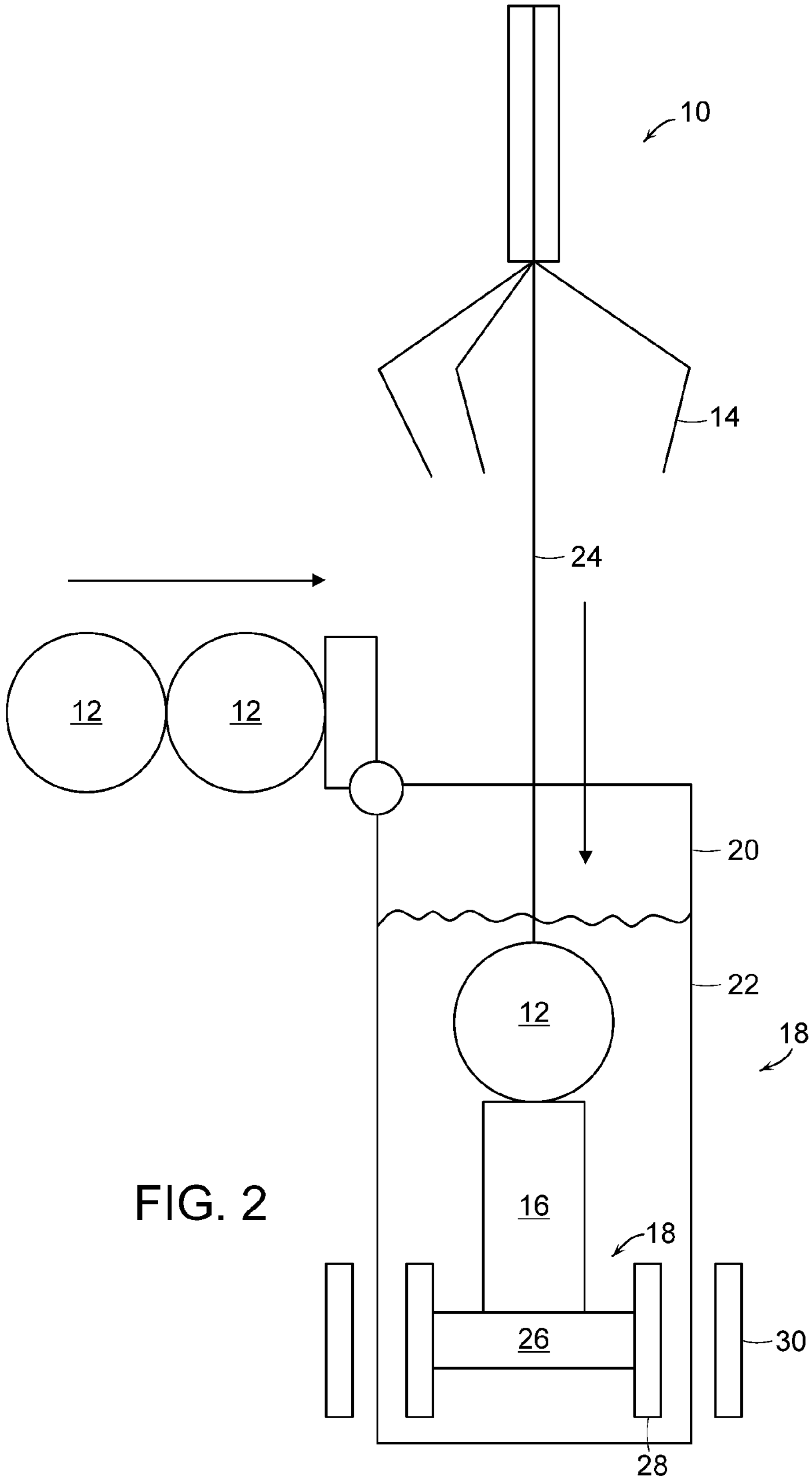
FIG. 2 is a schematic diagram of the apparatus of the present invention that illustrates dipping the core in a vessel containing a barrier composition.

As illustrated in FIG. 2, once core 12 is placed on holder 16, platform 18 is lowered into vessel 20. In one example, force applicator 24 is capable of applying sufficient force so that, in addition to stabilizing core 12 on core holder 16, it also, optionally, helps to lower platform 18 into vessel 20. Preferably, force applicator 24 is capable of exerting a force of from about 0.1 pounds to about 10 pounds. More preferably, the exerted force is greater than the core weight, which is typically about 1.5 oz.

In another example, composition 22 is maintained at a temperature below the melting point of core 12 and/or platform 18. Alternatively, the temperature of composition 22 is below the softening temperature of core 12. For instance, composition 22 has a temperature of from about 25° C. to about 100° C. and a viscosity of from about 25 cP to about 10,000 cP when in vessel 20. It is understood, by one of ordinary skill in the art, that the temperature and viscosity of the material are proportional. Once platform 18 and core 12 are immersed in composition 22, it rotates at a speed and for a time sufficient for composition 16 to contact all surface areas of core 12. To properly coat the porous surface areas of core 12, core 12 may be rotated at a speed of from about 1 rpm to about 200 rpm and for a time of from about 1 minute to about 5 seconds. Optionally, core 12 may be subjected to an oscillating movement along the vertical axis. Thus, the method for coating core 12 of the present invention with a water vapor barrier composition potentially includes two degrees of freedom—(1) a rotational or axial movement and (2) an oscillating movement along the vertical axis.

Figure 4:
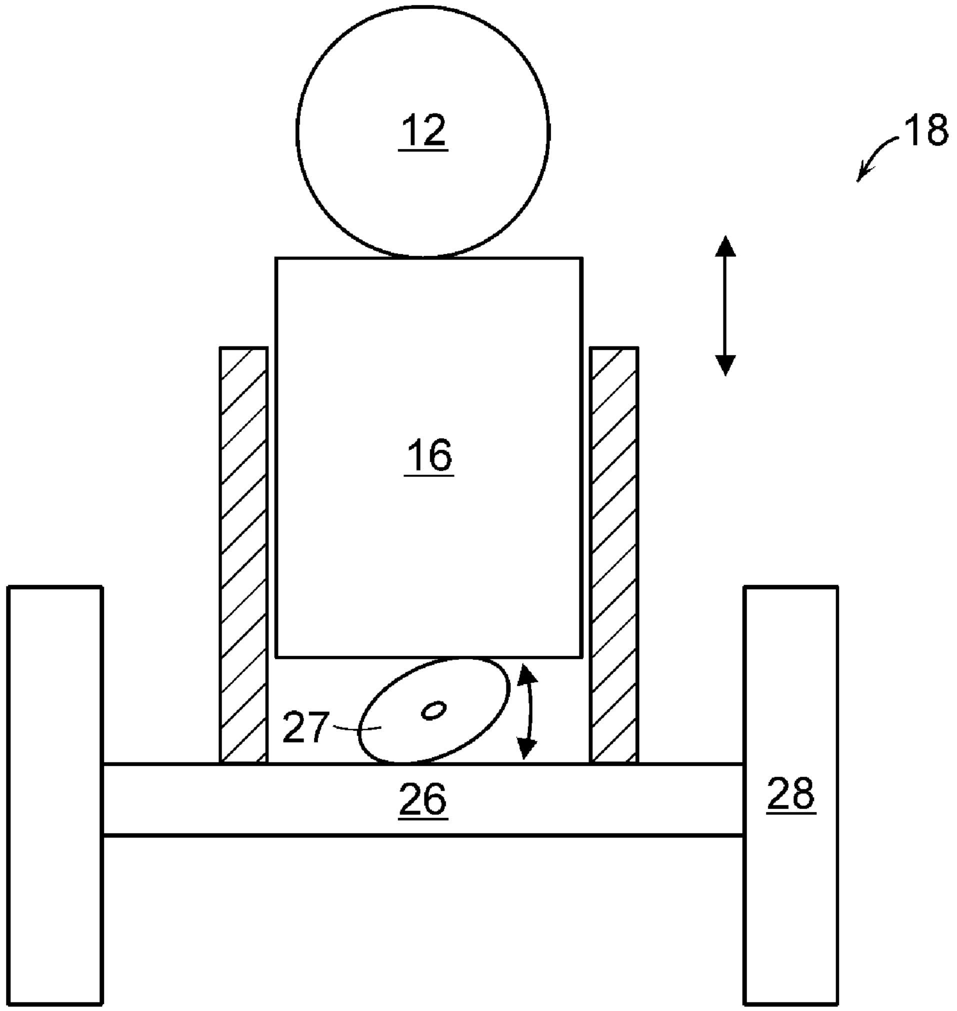
FIG. 4 is a schematic diagram of an alternative embodiment of the present invention.

Any device capable of spinning/rotating and optionally oscillating core 12 can be utilized in the present invention. As illustrated in FIG. 2, platform 18 includes magnetic side 28 and base 26, which supports holder 16. Preferably, magnetic side 28 is made from ferro-magnetic materials or from polymers containing ferro-magnetic materials. To rotate core 12, a magnetic device 30 is activated in order to move magnetic side 28, which in turn rotates base 26, core holder 16, and core 12. Preferably, magnetic producing field device 30 can be a solenoid that is capable of producing a magnetic field when electrical current passes therethrough strong enough to rotate core 12 at a predetermined speed. However, magnetic producing field device 30 can be any other device capable of rotating core 12 at a predetermined speed. For example, magnetic producing field device 30 can be permanent magnets placed on a rotating table. The table can be rotated by servo driven variable speed electrical motors. Preferably, magnetic producing field device 30 also causes platform 18 to move up and down. For example, base 26 includes a rotating cam 27 such that when base 26 rotates it also oscillates up-and-down, as shown in FIG. 4.

Figure 3:
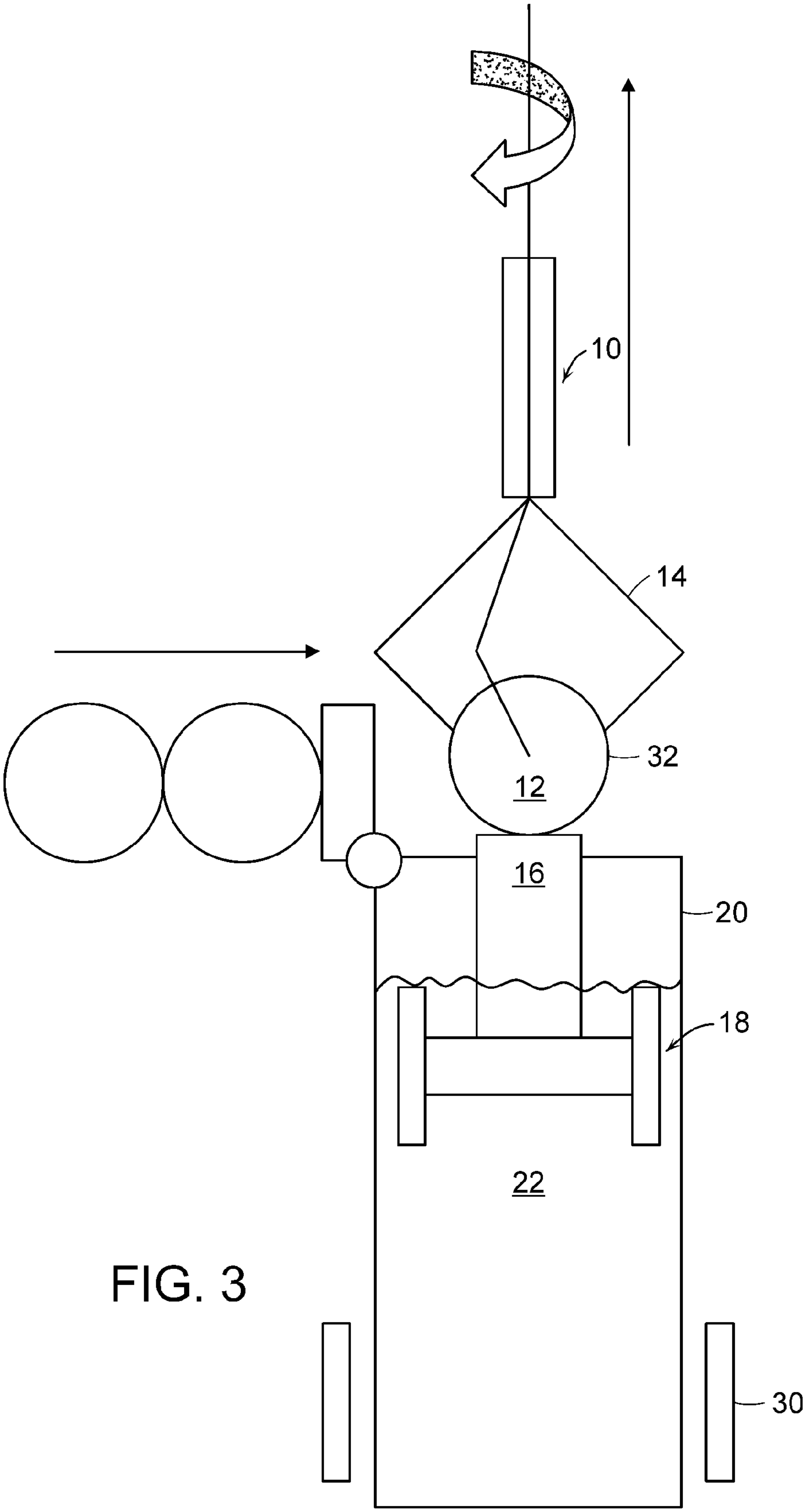
FIG. 3 is a schematic diagram of the apparatus of the present invention after the core has been dipped into the vessel containing the barrier composition.

As shown in FIG. 3, core 12 having water vapor barrier composition 22 coated thereon is removed from vessel 20. Preferably, platform 18 is raised for a distance such that core 12 coated with composition 22 is no longer in contact with composition 22 in vessel 20. Platform 18 is raised in order to eliminate the need for lifting device 10 and prongs 14 to dip into vessel 20 to acquire core 12 coated with composition 22. This reduces the time consuming task of cleaning composition 22 from lifting device 10 and prongs 14. Prongs 14 then lift the coated core from core holder 16 to a drying station or an oven. Preferably, prongs 14 do not enter vessel 20 at any point during the coating process.

To dispose of any excess composition 22, lifting device 10 rotates core 12. Preferably, lifting device 10 rotates core 12 coated with composition 22 at a low rpm. The rotational speed of lifting device 10 can be from about 1 rpm to about 300 rpm and, more preferably, from about 60 rpm to about 100 rpm. Once the excess composition 22 has been eliminated and the coating is dried or cured, the coated core is encased within a cover layer. The processes for encasing the coated core with a cover layer are well known to one skilled in the art. Excess composition 22 can be eliminated using a second magnetic device to rotate core 12. Alternatively, prongs 14 can spin independently to remove excess composition 22.

In one embodiment, after the excess composition 22 has been eliminated, heat is added to cure composition 22 or to increase the adhesion between core 12 and composition 22. The heat is added at a temperature below the melting point of core 12, e.g., the temperature of the heat is maintained at about 100° F. to about 212° F. Lifting device 10 of the present invention can be any type of lifting and rotating device capable of lifting core 12. Additionally, lifting device 10 includes a sufficient number of prongs 14 to be able to lift core 12. Prongs 14 can have any dimensions and length. Preferably, prongs 14 have a length that is greater than the radius of core 12, such as a length that is at least two times longer than the radius of core 12. Optionally, lifting device 10 includes force applicator 24, which can be a device as simple as a single rod capable of securing core 12 on core holder 16. Force applicator 24 is extendable such that when platform 18 is lowered into vessel 20, force applicator 24 can be lowered with platform 18 without the need to lower lifting device 10 or prongs 14 into vessel 20. Additionally, force applicator 24 is capable of rotating at a speed that is at least equivalent to the speed at which core 12 is rotated, when immersed in vessel 20.

Vessel 20 of the present invention can have any size, shape, and volume so long as vessel 20 is capable of accepting at least one core 12 and, preferably, in addition to core 12, at least one platform 18, and sufficient composition 22 to suitably coat core 12. Vessel 20 can be made from any material capable of withstanding the heat applied to composition 22 in vessel 20.

Composition 22 of the present invention is capable of preventing or minimizing the penetration of moisture, typically water vapor, into the core. Preferably, moisture vapor barrier composition 22, when cured or dried, has a moisture vapor transmission rate that is lower than that of the cover of a golf ball and, more preferably, less than the moisture vapor transmission rate of an ionomer resin such as SURLYN®, which is in the range of about 0.45 to about 0.95 grams·mm/m$^2$·day. Typically, the moisture vapor transmission rate of ionomer resin is less than 0.6 grams·mm/m$^2$·day as reported in "Permeability and other Film Properties of Plastics and Elastomer" published by the Plastic Design Library (1995). The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-94 entitled "Standard Test Method for Water Vapor Transmission Rate of Flexible Barrier Materials Using an Infrared Detection Technique," among others.

In another embodiment, the moisture vapor transmission rate of the moisture vapor barrier layer is about 0.45 grams-mm/m$^2$—day or less. In yet another embodiment, the moisture vapor transmission rate of the moisture vapor barrier layer is about 0.3 grams·mm/m$^2$ or less. The moisture vapor barrier layer can be formed from multi-layer thermoplastic films, blend of ionomers, polyvinyl alcohol copolymers and polyamides, dispersions of acid salts of polyetheramines. In one embodiment, the moisture vapor barrier layer has a high specific gravity to contribute to a high moment of inertia, low spin ball.

The moisture vapor barrier composition may comprise nano particles, flaked glass, leafing or non-leafing metal flakes (e.g., aluminum flakes, iron oxide flakes, copper flakes, bronze flakes) or ceramic particles to increase the layer's resistance to the transmission of moisture through the layer by creating a tortuous path for water vapor. One advantage of the present invention is that these particles can be easily mixed with barrier composition 22 in vessel 20. The rotation of platform 18 within vessel 20 helps maintain the particles in suspension.

A suitable primary ingredient for moisture vapor barrier material is butyl rubber. Butyl rubber (IIR) is an elastomeric copolymer of isobutylene and isoprene, which is fully described in U.S. Patent Application Publication No. 2004/0142769 A1, incorporated herein by reference in its entirety. Detailed discussions of butyl rubber are provided in U.S. Pat. Nos. 3,642,728; 2,356,128; 4,229,337; and 3,099,644, which are incorporated herein by reference in their entireties. Butyl rubber can exist in a liquid form, dissolved in non-polar aromatic hydrocarbon solvents such as mineral spirits (xylene and toluene), polar compounds such as ketones (e.g., acetophenone, butanone (methyl ethyl ketone) and propanone (acetone)). and other aggressive solvents. Other suitable moisture vapor barrier polymers include the elastomers that combine the low permeability of butyl rubbers with the environmental and aging resistance of ethylene propylene diene monomer rubbers (EPDM), commercially available as EXXPRO™ from ExxonMobil Chemical.

Another suitable moisture vapor barrier polymer is polyisobutylene. Commercially available grades of polyisobutylene, under the trade name VISTANEX™ also from ExxonMobil Chemical, are highly paraffinic hydrocarbon polymers composed on long straight chain molecules containing only chain-end olefinic bonds.

Rubber blend moisture barrier can also be used in the present invention. These barriers are discussed in U.S. Pat. No. 6,342,567 B2, which is incorporated herein by reference in its entirety. Other moisture vapor barrier polymers include thermoplastic elastomer blends that may be dynamically vulcanized and comprise a butyl rubber or a halogenated butyl rubber, such as those discussed in U.S. Pat. Nos. 6,062,283; 6,334,919 B1; and 6,346,571 B1, which are incorporated herein by reference in their entirety. Alternatively, butyl rubber may be blended with a vinylidene chloride polymer, i.e., saran, as disclosed in U.S. Pat. No. 4,239,799, which is incorporated herein by reference in its entirety. Other water vapor barrier compositions are discussed in U.S. Pat. No. 6,632,147, which is incorporated herein in its entirety by reference.

Other exemplary suitable material for the barrier layer of the present invention include, but are not limited to, synthetic or natural rubbers, such as polyolefins, styrenic polymers, single-site catalyzed polymers, acrylics, etc. Polyolefins and copolymers or blends thereof include balata, polyethylene, chlorinated polyethylene, polypropylene, polybutylene, butyl-based rubbers, isoprene rubber, trans polyisoprene, neoprene, ethylene-propylene rubber, ethylene-butylene rubber, and ethylene-propylene-(non-conjugated diene) terpolymers. Styrenic polymers include polystyrenes and copolymers thereof, such as styrene-butadiene copolymers, poly (styrene-co-maleic anhydride), acrylonitrile-butylene-styrene copolymers, styrene-olefin block copolymers (e.g. KRATON® rubbers from Shell Chemical), and poly(styrene sulfonate). Examples of styrene-olefin block copolymers are described in U.S. Pat. Nos. 4,501,842, 5,118,748, and 6,190,816. The disclosures of these patents are incorporated herein by reference in their entirety.

Single-site catalyzed polymers include homopolymers and copolymers, such as grafted or non-grafted metallocene-catalyzed polyolefins. Compatibilizers may be added into the barrier blends. The compatibilizer material is often a block copolymer where each block has an affinity for only one of the blend components to be compatibilized. The compatibilizer is thought to associate across the boundaries between phase-separated regions in the polymer blend. It is used to bind the regions together and to enhance the structural integrity and mechanical properties of the resulting compatibilized material. Optionally, these thermoplastic rubbers or blend thereof are mixed with a cross-linking agent to form a thermoset rubber material. Suitable cross-linking agents include the polymeric polyahls disclosed herein, particularly polyolefin polyols such as hydrogenated polybutadiene polyols (e.g. POLYTAIL® H and POLYTAIL® HA available from Mitsubishi Kasei Corp. of Tokyo, Japan, and KRATON® L-2203 available from Kraton Polymers of Houston, Tex.). The amount of the cross-linking agent is at least about 10 parts per 100 parts by weight of the rubber material, more preferably at least about 20 phr. Other additives suitable for the barrier layer include, but are not limited to, catalysts such as tertiary amines, and coupling agents such as silanes to bond the fillers to the polymer matrix. The coupling agent further enhances adhesion of the barrier layer to substrates such as a golf ball core or outer core layer, and to the layer such as a cover layer or an intermediate layer formed immediately over the barrier layer. Similar exemplary barrier layers are disclosed in U.S. Patent Application Publication No. 2004/0048688, which is incorporated herein by reference in its entirety.

Water vapor barrier materials may be based on an isocyanate-terminated liquid polysulfide polymer, which is disclosed in U.S. Pat. No. 6,322,650 B1, which is incorporated herein by reference in its entirety. The liquid polymer is formed by first splitting the polysulfide by reacting it as a latex dispersion in water with a dithiodialkyleneglycol and aqueous sodium sulfite at the reflux temperature and adding hydrogen peroxide for oxidative coupling of chains having residual mercaptan groups. This reaction yields hydroxyl-terminated polysulfide having a molecular weight of about 3% of the pre-reaction value, or about 2500 to 4000. The water vapor barrier material is then prepared by reacting the hydroxyl terminated polysulfide with a polyisocyanate at a ratio between 1::1 and 1::1.2 on an equivalent basis. Generally, any organic polyisocyanate is suitable, including isophorone diisocyanate (abbreviated as IPDI); arylene polyisocyanates such as tolylene-, metaphenylene-, methylene-bis-(phenylene-4-) (abbreviated as MDI and sold under the trademark RUBINATE 9310), biphenylene-4,4'-; 3,3'-dimethoxybiphenylene-4,4'-; 3,3'-biphenylene-4,4'-; and methylene-(tetramethylxylene-) (abbreviated as MTMXDI); alkylene polyisocyanates such as ethylene-, ethylidene-, propylene-1,2-, butylene-1,4-; butylene-1,3-; cyclohexylene-1,4-; methylene-bis(cyclohexyl-4,4')-; and hexamethylene-1,6-diisocyanate (abbreviated as HDI). Additives, such as a curing catalyst, a chain stopper, a plasticizer, fillers, dehydrating agents and thixotropic agents can be added to the reaction. This water vapor barrier material or sealant exhibits very low moisture vapor transmission rate. Such barrier layers are described in detail in U.S. Patent Application No. 2004/0147344 A1, which is incorporated herein by reference in its entirety.

Other water vapor barrier forming material includes fluorine. For example the water vapor barrier layer may be a vermiculite layer, as described in U.S. Pat. No. 5,821,488, which is incorporated herein by reference in its entirety.

Core 12 of the present invention is made from thermoplastic and/or thermoset elastomers, such as natural rubber, polybutadiene, polyisoprene, styrene-butadiene or styrene-propylene-diene rubber, ionomer resins, polyamides, polyesters, polyurethanes, polyureas, PEBAX™ from AtoFina Chemicals Inc., HYTREL™ from E. I. Du Pont de Nemours and Company, and KRATON™ from Shell Chemical Company. Additionally, the core can be made from or further include materials such as polyurethanes, polyureas, epoxies, silicones, interpenetrating polymer networks, and the like. Alternative and/or additional suitable core materials may also include a RIM polyurethane or polyurea, preferably the nucleated versions where nitrogen gas is whipped into the reaction mixture prior to injection into a closed mold to form the layer. One skilled in the art understands that other elastomers may be used as the core material without departing from the scope and spirit of the present invention. Some exemplary core materials are described in U.S. Pat. No. 6,632,147, which is previously incorporated herein, and U.S. Patent Application Publication No. 2004/0048688, which is previously incorporated by reference in its entirety.

The core of the preset invention may include an inner core and optionally an outer core. Core 12, in one example, includes at least a layer of elastomer, such as a diene polymer, that is cross-linked with low levels of a reactive co-agent, such as metal salt of diacrylate, dimethacrylate or monomethacrylate, preferably zinc diacrylate (ZDA), or alternatively with no reactive co-agent. Suitable metal salts include zinc, magnesium, calcium, barium, tin, aluminum, lithium, sodium, potassium, iron, zirconium, and bismuth, among others. Preferably, the elastomer is cross-linked with a cross-linking initiator, such as peroxide or sulfur. As used herein, a diene is a molecule, which contains two carbon-carbon double bonds, and a diene polymer is a polymer made from monomers, which have two carbon-carbon double bonds in the 1 and 3 positions. Suitable diene polymers include, but are not limited to, any polymers comprising natural rubbers, including cis-polyisoprene, trans-polyisoprene or balata, synthetic rubbers including 1,2-polybutadiene, cis-polybutadiene, trans-polybutadiene, polychloroprene, poly(norbornene), polyoctenamer and polypentenamer among other diene polymers.

Other suitable diene polymeric materials, which can be cross-linked with low levels of metal salt diacrylate, dimethacrylate or monomethacrylate reactive co-agent or none at all, further include metallocene catalyzed diene polymers, copolymers and terpolymers such as metallocene catalyzed polybutadiene, ethylene propylene rubber, ethylene-propylene-diene monomer terpolymers (EPDM), butadiene-styrene polymers, isoprene, copolymers with functionalized monomers (polar groups), among others. As used herein, the term "metallocene catalyzed" includes polymerization catalyzed by metallocenes, which generally consist of a positively charged metal ion placed between two negatively charged cyclopentadienyl anions, and other single-site catalysts. Additionally, suitable elastomeric core materials also include the metallocene catalyzed polymers disclosed in U.S. Pat. Nos. 5,981,658, 5,824,746, 5,703,166, 6,126,559, 6,228,940, 6,241,626 and 6,414,082. Metallocene catalyzed polymers can be cross-linked with a cross-linking initiator, such as peroxide, or can be cross-linked by radiation, among other techniques. Additional suitable core materials include poly (styrene-butadiene-styrene) or SBS rubber, SEBS or SEPS block polymers, styrene-ethylene block copolymers, any polar group grafted or copolymerized polymers such as maleic anhydride or succinate modified metallocene catalyzed ethylene copolymer or blends thereof.

Thermoplastic elastomers, such as ionic or non-ionic polyester, polyether, polyamide may also be present in amounts of less than 50% of the polymeric content of the core may be included to adjust or modify any physical property or manufacturing characteristics. Furthermore, any organo-sulfur or metal-organo-sulfur compound, such as zinc pentachlorothiophenol (ZnPCTP) or pentachlorothiophenol (PCTP), to increase COR or rigidifying agents, such as those disclosed in U.S. Pat. Nos. 6,162,135, 6,180,040, 6,180,722, 6,284,840, 6,291,592 and 6,339,119 and those disclosed in co-pending U.S. Pat. No. 6,635,716, may be added.

In another example, core 12 includes a stiff, highly cross-linked inner core encased by an outer core layer. The inner core preferably comprises 100 parts cis-polybutadiene or trans-polybutadiene cross-linked with about 10 to 50 phr ZDA reactive co-agent. Preferably, the inner core has a diameter in the range of about 0.1 inch to about 1.6 inch (about 2.54 mm to about 40.64 mm), and the outer core layer has a thickness of about 0.01 inch to about 0.1 inch (about 0.25 mm to about 2.54 mm). Alternatively, the inner core may comprise a higher cross-linked density material to provide a higher flexural modulus to increase the COR for core 12. Such higher cross-linked density material may contain about 100 parts polymer such as polybutadiene, greater than 50 phr of ZDA or other metal salt of diacrylate, dimethacrylate or monomethacrylate reactive co-agent, about 0.1 to 6.0 phr of peroxide cross-linking initiator, a heavy filler and an optional organic sulfur such as ZnPCTP. More detail on these and other option core compositions are described in the co-pending U.S. Patent Application No. 2003/0022733 A1, which is incorporated herein by reference in its entirety.

Core 12 can be a wound core or a solid core.

The cover layer(s) may include any materials known to those of ordinary skill in the art, including thermoplastic and thermosetting materials, but preferably include ionic copolymers of ethylene and an unsaturated monocarboxylic acid, such as SURLYN®, commercially available from E. I. DuPont de Nemours & Co., of Wilmington, Del., and IOTEK® or ESCOR®, commercially available from Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated a monocarboxylic acid having 3 to 8 carbon atoms. The carboxylic acid groups of the copolymer may be totally or partially neutralized and might include methacrylic, crotonic, maleic, fumaric or itaconic acid.

Alternatively, the cover layer(s) may include polyurethane or urethane. In one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

The cover materials of this invention can likewise be used in conjunction with homopolymeric and copolymer materials, as described in U.S. Patent Application Publication No. 2002/0151380.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of forming a layer of a golf ball comprising the steps of:

providing a lifting device adapted to transport a core of the golf ball to a holder and place the core on the holder;

providing a holder that is adapted to receive the core while at least a portion of the holder is not in contact with the composition that forms the layer;

providing a vessel containing the composition that forms the layer;

providing a magnetic producing field device designed for rotating the core and the holder in the composition at a predetermined speed while forming the layer;

transporting the core to the holder and placing the core on the portion of the holder that is not in contact with the composition that forms the layer;

separating the core from the lifting device before immersing the core in the composition;

immersing the core into the composition by lowering the holder into the vessel in a direction orthogonal to a base of the vessel;

activating the magnetic producing field device at a predetermined speed and time thereby rotating the holder and the core in the composition and contacting all surface areas of the core to coat the core;

at least partially removing the holder from the composition by raising the holder in a direction orthogonal to the base of the vessel so that the core coated with composition is no longer in contact with the composition; and repeating said method on at least a second core using the same holder and lifting device without cleaning the lifting device before repeating the method.

2. The method of claim 1, further comprising the step of spinning the coated core to remove excess composition.

3. The method of claim 2, further comprising the step of transporting the coated core to a drying station.

4. The method of claim 3, further comprising the step of applying heat to the coated core.

5. The method of claim 1, wherein the step of immersing the core further includes applying a force on a single point of the core located on the holder.

6. The method of claim 1, wherein the step of rotating the core comprises spinning the holder.

7. The method of claim 5, wherein the step of rotating the core further comprises the step of oscillating the core within the composition.

8. The method of claim 7, wherein the steps of oscillating and coating the core occur at about the same time.

9. The method of claim 1 wherein the composition comprises water vapor barrier property.

10. The method of claim 1, further comprising the step of adding particles to the composition.

* * * * *